(12) United States Patent
Matsuda (10) Patent No.: US 10,916,961 B2
(45) Date of Patent: Feb. 9, 2021

(54) ELECTRONIC APPARATUS

(71) Applicant: TOSHIBA TEC KABUSHIKI KAISHA, Tokyo (JP)

(72) Inventor: Okiharu Matsuda, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/270,628

(22) Filed: Feb. 8, 2019

(65) Prior Publication Data

US 2019/0173308 A1    Jun. 6, 2019

Related U.S. Application Data

(63) Continuation of application No. 15/259,304, filed on Sep. 8, 2016, now Pat. No. 10,243,391.

(30) Foreign Application Priority Data

Nov. 16, 2015   (JP) .................. 2015-223957

(51) Int. Cl.
| | |
|---|---|
| *H02J 7/02* | (2016.01) |
| *H02H 5/04* | (2006.01) |
| *H02J 7/00* | (2006.01) |
| *H02J 50/10* | (2016.01) |
| *H02H 7/18* | (2006.01) |

(52) U.S. Cl.
CPC ............. *H02J 7/025* (2013.01); *H02H 5/042* (2013.01); *H02J 7/00* (2013.01); *H02J 7/0029* (2013.01); *H02J 50/10* (2016.02); *H02H 7/18* (2013.01)

(58) Field of Classification Search
CPC .. H02J 7/00; H02J 7/0029; H02J 7/025; H02J 50/10; H02H 5/042; H02H 7/18

USPC ............................................ 307/31; 320/108
See application file for complete search history.

(56) References Cited

U.S. PATENT DOCUMENTS

| | | | |
|---|---|---|---|
| 2012/0038317 A1 | 2/2012 | Miyamoto et al. | |
| 2014/0070761 A1 | 3/2014 | Labbe et al. | |
| 2016/0046199 A1* | 2/2016 | Butler ................... | H02J 7/0071 320/106 |

FOREIGN PATENT DOCUMENTS

| | | |
|---|---|---|
| EP | 2579419 | 4/2013 |
| EP | 2705877 | 3/2014 |
| JP | 08-308139 | 11/1996 |
| JP | 2005-245078 | 9/2005 |
| JP | 2008-006686 | 1/2008 |

(Continued)

OTHER PUBLICATIONS

Extended European Search Report for European Patent Application No. 16189297.1 dated Mar. 27, 2017.

(Continued)

*Primary Examiner* — Hal Kaplan
(74) *Attorney, Agent, or Firm* — Amin, Turocy & Watson, LLP (57) ABSTRACT

An electronic apparatus comprises a power receiving unit configured to receive electric power transmitted from a power transmitting apparatus in a non-contact manner, and charge a battery that powers the electronic apparatus with the electric power; a temperature monitor configured to change output according to temperature; and a charge controller configured to instruct the power receiving unit to execute charge control of the battery based on the output of the temperature monitor.

12 Claims, 5 Drawing Sheets

(56) References Cited

FOREIGN PATENT DOCUMENTS

JP      2008-017562      1/2008
JP      2013-236524      11/2013

OTHER PUBLICATIONS

Non-Final Office Action for U.S. Appl. No. 15/259,304 dated May 2, 2018.
Japanese Office Action for Japanese Patent Application No. 2015-223957 dated Apr. 16, 2019.
Japanese Office Action for Japanese Patent Application No. 2015-223957 dated Nov. 5, 2019.

\* cited by examiner

ELECTRONIC APPARATUS

CROSS-REFERENCE TO RELATED APPLICATIONS

This application is a Continuation of application Ser. No. 15/259,304 filed on Sep. 8, 2016, the entire contents of which are incorporated herein by reference.

This application is based upon and claims the benefit of priority from Japanese Patent Application No. P2015-223957, filed Nov. 16, 2015, the entire contents of which are incorporated herein by reference.

FIELD

Embodiments described herein relate generally to an electronic apparatus and associated methods.

BACKGROUND

In recent years, a charge operation without the need of terminal connection (non-contact charge) is executed to an electronic apparatus in which a battery is built. A power transmitting apparatus is general-purpose for various electronic apparatuses as a power receiving side is not dedicated to one specific power receiving apparatus. In such a power transmitting apparatus, there is a device used to monitor temperature and stop power transmission if necessary in order to prevent damage or an accident caused by overheating at the time of charging.

The electronic apparatus serving as the power receiving side charges the battery with electric power received from the power transmitting apparatus; however, there is a limit to the capability for converting the received electric power to power for charge (conversion capability). If excessive electric power exceeding the conversion capability is transmitted from the power transmitting apparatus, the surplus electric power is converted to heat. If the electronic apparatus continues to generate the heat, there is also a case in which the electronic apparatus undesirably burns a user. Further, there is a case in which the power transmitting apparatus enters a power transmission stop state as the heat of the electronic apparatus conducts to the power transmitting apparatus.

As the charge of the electronic apparatus is executed in a period of time (e.g., night time) in which the electronic apparatus is not used, there are many cases in which there is no person who pays attention to the electronic apparatus, for example, there is no person around the electronic apparatus. In such a situation, if the power transmission from the power transmitting apparatus is stopped due to overheating, a failure that the charge is not completed in a scheduled time occurs.

DESCRIPTION OF THE DRAWINGS

FIG. 4-1 is a flowchart illustrating the flow of a charge control processing; and FIG. 4-2 is a flowchart illustrating the flow of the charge control processing.

DETAILED DESCRIPTION

In accordance with an embodiment, an electronic apparatus comprises a power receiving unit, a temperature monitor or measuring section and a charge controller. The power receiving unit receives electric power transmitted from a power transmitting apparatus in a non-contact manner, and charges a battery within the electronic apparatus with the electric power. The temperature monitor measures temperature and changes output according to temperature. The charge controller instructs the power receiving unit to execute charge control of the battery based on the output of the temperature monitor.

In accordance with another embodiment, a method of charging an electronic apparatus involves transmitting electric power from a power transmitting apparatus in a non-contact manner to a power receiving unit of the electronic apparatus to charge a battery that powers the electronic apparatus with the electric power; changing output according to temperature; and executing charge control of the battery based on the output.

First Embodiment

Figure 1:
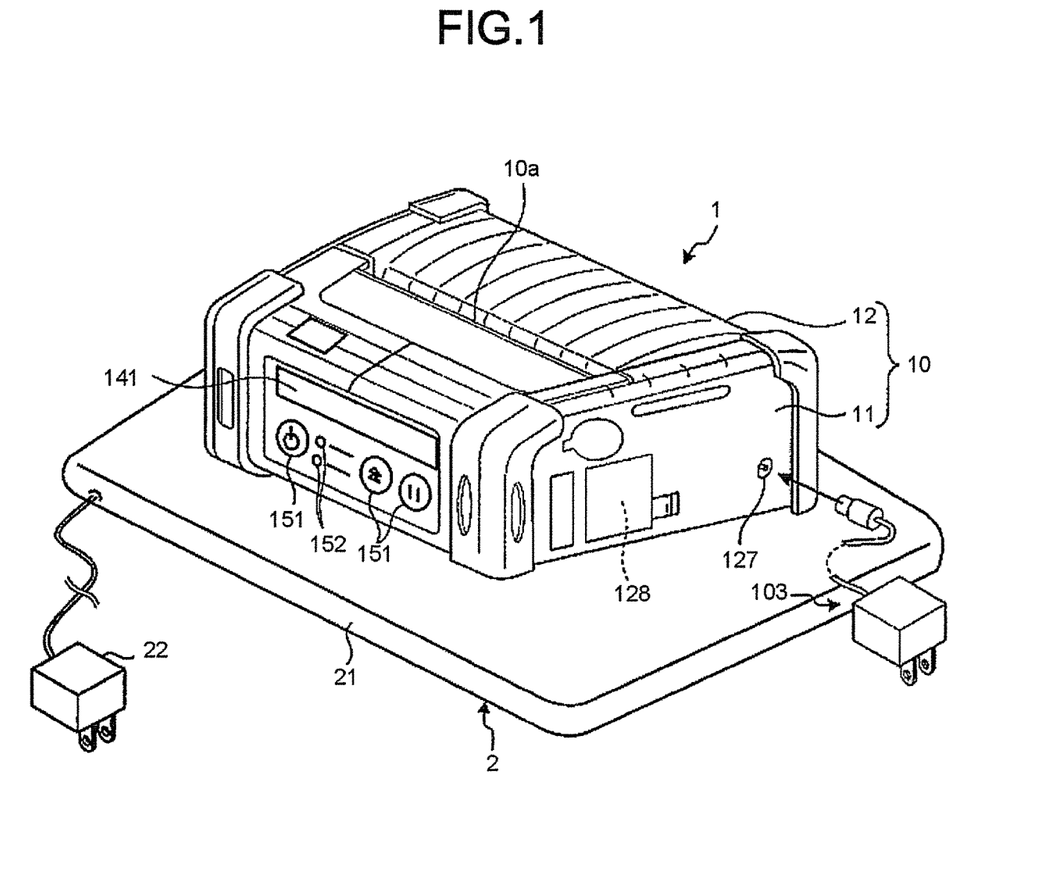
FIG. 1 is a perspective view illustrating appearances of a portable printer and a charge stand according to an embodiment.
Figure 2:
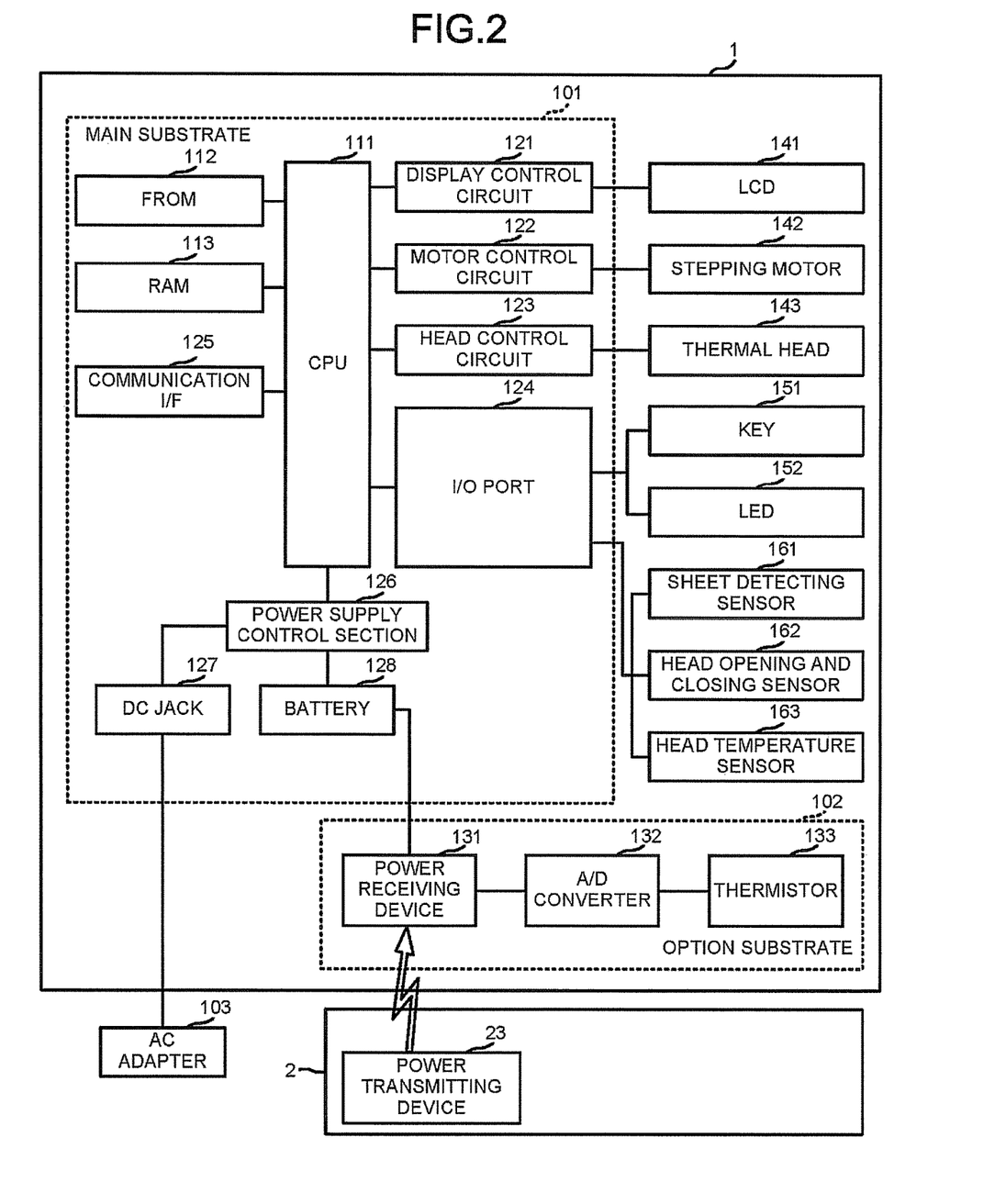
FIG. 2 is a block diagram illustrating configurations of the portable printer and the charge stand.

The present embodiment is described with reference to the accompanying drawings. FIG. 1 is a perspective view illustrating appearances of a portable printer 1 and a charge stand 2. FIG. 2 is a block diagram illustrating configurations of the portable printer 1 and the charge stand 2.

The portable printer (hereinafter, simply referred to as a printer) 1 is a small printer easy to carry. The printer 1 is an example of an electronic apparatus, and the charge stand 2 is an example of the power transmitting apparatus. Other examples of electronic apparatuses include a projector, scanner, copier, facsimile device, display device, and the like. The charge stand 2 transmits the electric power to the printer 1. The printer 1 receives the electric power transmitted from the charge stand 2 and charges a battery 128 with the electric power.

The charge stand 2, as shown in FIG. 1, is equipped with a main body 21 and a power supply cord 22 for supplying power to the main body 21. The charge stand 2 is equipped with a power transmitting device 23 in the main body 21, as shown in FIG. 2. The power transmitting device 23 transmits the electric power to the printer 1. The power transmission and reception from the charge stand 2 to the printer 1 is carried out without a physical, conductive connection terminal. In other words, the printer 1 carries out a so-called non-contact charge. In the non-contact power supply from the charge stand 2 to the printer 1, a well-known technology (for example, including an electromagnetic induction method and a magnetic field resonance method) is used.

The printer 1 is equipped with a casing 10 composed of a main body section 11 and a lid 12, as shown in FIG. 1. The main body section 11 is a box-type container a part of which is opened. The lid 12 is mounted in the main body section 11 with one end part rotatable, and closes and opens an opening of the main body section 11 through rotation. An issuing port 10a is arranged between a rotation end of the lid 12 and the main body section 11 in a state in which the lid 12 closes the opening of the main body section 11.

The printer 1 is equipped with a main substrate 101 and an option substrate 102 inside the casing 10, as shown in FIG. 2.

In the main substrate 101, a CPU 111, an FROM 112, a RAM 113, a display control circuit 121, a motor control circuit 122, a head control circuit 123, a I/O port 124, a communication interface (communication I/F) 125, a power supply control section 126 and a DC jack 127 are arranged. The battery 128 is connected with the power supply control section 126.

In the option substrate 102, a power receiving device 131, an A/D converter 132 and a thermistor 133 are arranged.

The FROM (Flash ROM (Read Only Memory)) 112 stores various programs executed by the CPU 111. The RAM (Random Access Memory) 113 stores variable data in a rewritable manner and is used as a working area.

The CPU (Central Processing Unit) 111 functions as various modules to collectively control each section constituting the printer 1 through copying or decompressing programs stored in the FROM 112 on the RAM 113 to execute the programs.

The display control circuit 121 controls an LCD (Liquid Crystal Display) 141 according to the control of the CPU 111. The LCD 141 is arranged in such a manner that a display surface thereof faces the outer surface of the main body section 11 and is an example of a display section for displaying characters and images.

The motor control circuit 122 controls a stepping motor 142. The head control circuit 123 controls a thermal head 143. The stepping motor 142 rotates a platen roller (not shown). The thermal head 143 and the platen roller constitute a printing section used to carry out printing on a sheet. The platen roller and the thermal head 143 sandwich a sheet serving as a printing object therebetweeen and conveys the sheet through rotation. The thermal head 143 is equipped with a plurality of heating elements (not shown), and prints on a sheet through the heating by the heating element.

The thermal head 143 is arranged in the main body section 11, and the platen roller is arranged at the lid 12. When the lid 12 is located at a position where the lid 12 opens the opening of the main body section 11, the platen roller is positioned away from the thermal head 143. When the lid 12 is located at a position where the lid 12 closes the opening of the main body section 11, the platen roller contacts the thermal head 143.

The I/O port 124 inputs output from a key 151 to the CPU 111, and transmits a control signal from the CPU 111 to the LED 152. The key 151 and the LED 152 are arranged on the outer surface of the main body section 11. The key 151 is an example of an operation section for receiving operation input from a user of the printer 1. The LED (Light Emitting Diode) 152 is an example of an informing section for informing various kinds of information such as a status of the printer 1 to the user of the printer 1.

The I/O port 124 transmits output from various detecting sections including, for example, a sheet detecting sensor 161, a head opening and closing sensor 162 and a head temperature sensor 163 to the CPU 111. The sheet detecting sensor 161 detects the sheet between the thermal head 143 and the platen roller. The head opening and closing sensor 162 detects that the thermal head 143 contacts the platen roller, in other words, the lid 12 closes the opening of the main body section 11. The head temperature sensor 163 detects the temperature of the thermal head 143.

The communication I/F 125 is a communication unit for executing near distance wireless communication with an NFC (Near Field Communication) corresponding device. The printer 1 according to the present embodiment communicates with, via the communication I/F 125, an external device (not shown) such as a PDA (Personal Digital Assistant) device, a smart phone or a PC (Personal Computer). The communication I/F 125 communicates the status of the printer 1 to the external device, and receives print data to be printed by the printer 1 from the external device.

The power supply control section 126 selects and switches an acquiring source of the electric power used by each section of the main substrate 101 according to the status. As the acquiring source of the electric power, there is the electric power received from an AC adapter 103 via the DC jack 127 and the battery 128. The printer 1 operates through the electric power supplied via the power supply control section 126.

The battery 128 is charged through the electric power received from the power receiving device 131. The battery (rechargeable battery, storage battery or secondary battery) 128 is a battery capable of storing electricity through charge, and is, for example, a lithium-ion battery or nickel cadmium battery.

The option substrate 102 does not receive the power supplied from the main substrate 101. The power receiving device 131 which is an example of the power receiving section contains a coil (or an antenna), a rectifier and the like, for example. The power receiving device 131 receives the electric power transmitted from the power transmitting device 23 of the charge stand 2 in a non-contact manner, and charges the battery 128 with the electric power.

The thermistor 133 receives the power supplied from the power receiving device 131, and changes output according to the temperature. The thermistor 133 is an example of a temperature monitor for measuring the temperature of the electronic apparatus. The thermistor 133 is arranged nearby the power receiving device 131 and the battery 128 in order to easily detect the generation of the heat.

The A/D converter 132 converts the output (analog value) of the thermistor 133 to a digital value. The output of the thermistor 133 is transmitted to the CPU 111 after passing through a path composed by the A/D converter 132, the power receiving device 131, the battery 128 and the power supply control section 126.

Figure 3:
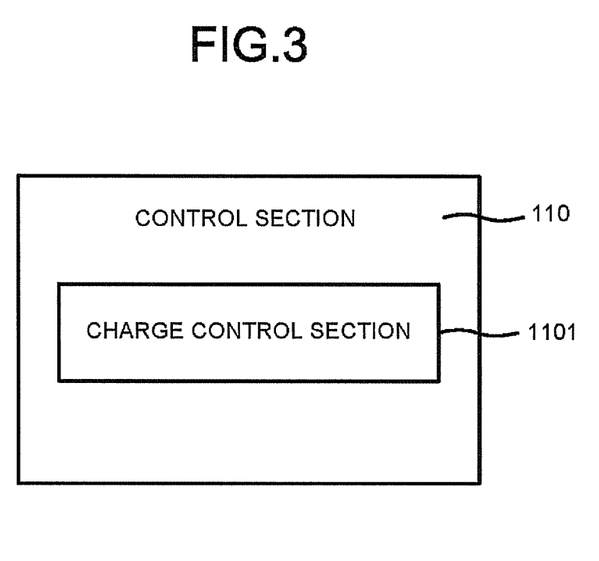
FIG. 3 is block diagram illustrating modules included in a control section.

FIG. 3 is block diagram illustrating modules included in the control section 110. The CPU 111, the FROM 112 and the RAM 113 constitute the control section 110. The control section 110 is equipped with a charge controller 1101. The charge controller 1101 is a module generated through the execution of the programs stored in the FROM 112 by the CPU 111.

Figure 41:
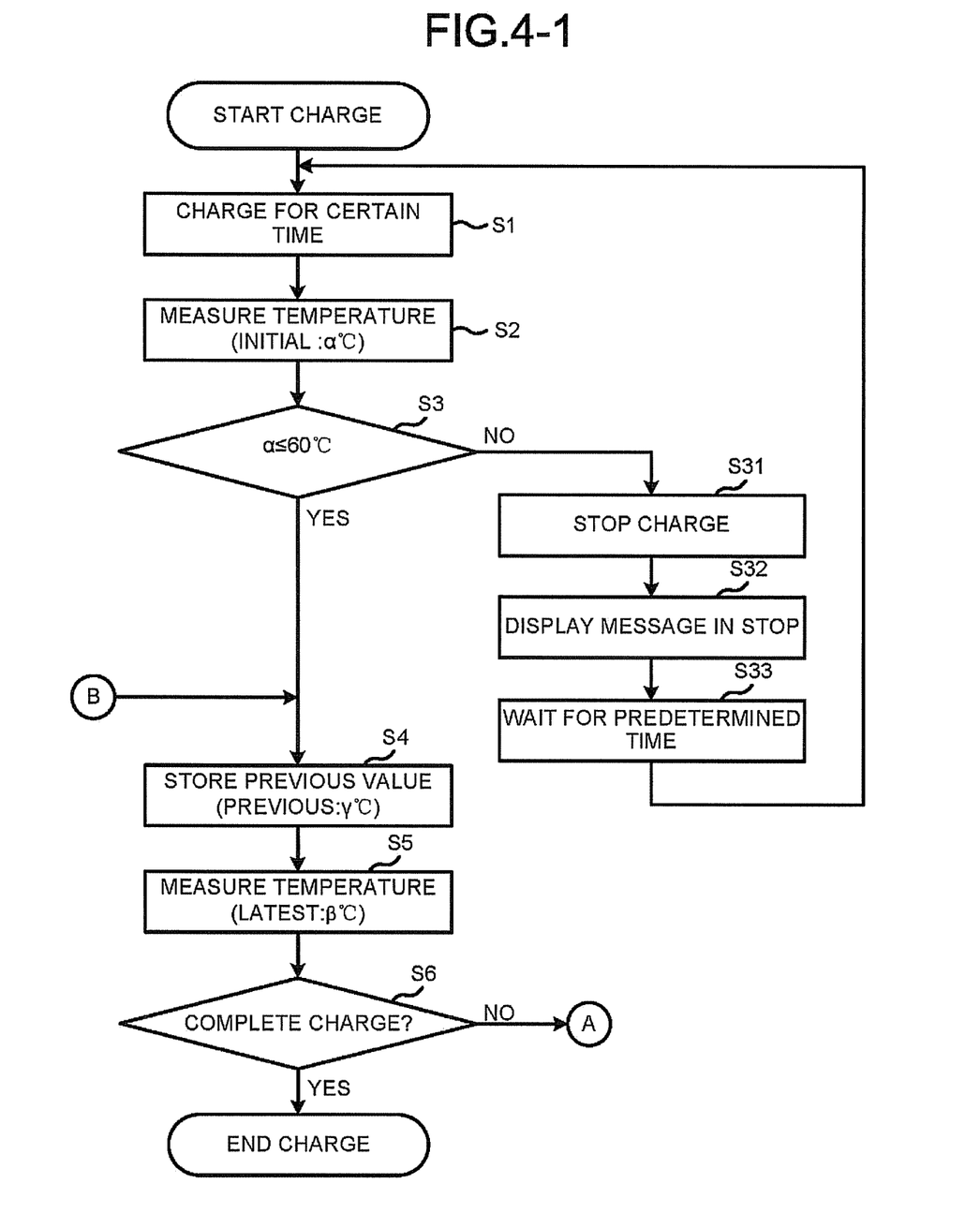
Figure 42:
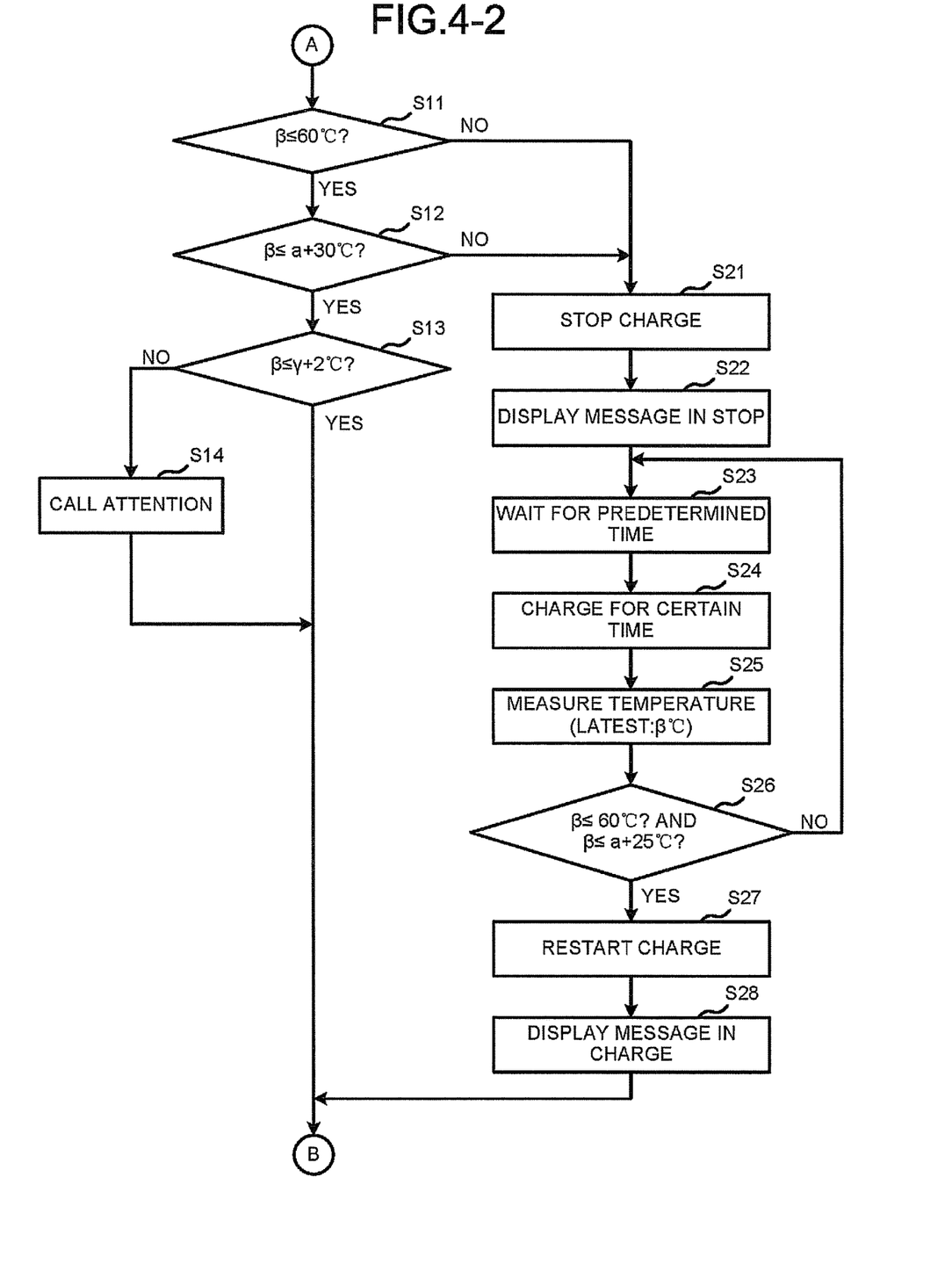

The control section 110 at the time of functioning as the charge controller 1101 executes processing the flow of which is illustrated in the flowcharts in FIG. 4-1 and FIG. 4-2. The processing is a charge control processing.

As an example of the charge control processing, three variables including an initial value $\alpha$ (degrees centigrade), a latest value $\beta$ (degrees centigrade) and a previous value $\gamma$ (degrees centigrade) are used. Additional variables can be used. Each variable stores a value calculated from the output of the thermistor 133 as the measured value (temperature measuring value) of the temperature. The initial value $\alpha$ stores the original temperature measuring value at the time of starting the charge. The latest value $\beta$ stores the temperature measuring value in the charge process. The previous value $\gamma$ stores a value just before the latest value $\beta$ is updated, and is a variable for saving (storage). The latest value $\beta$ is updated at any time in the charge control processing, and the previous value $\gamma$ is updated according to the latest value $\beta$ before updating prior to the updating of the latest value $\beta$.

In the charge control processing, first, the control section 110 carries out the charge for a certain time (ACT S1). In other words, the control section 110 enables the power receiving device 131 to operate. The power receiving device 131 receives the electric power transmitted from the power transmitting device 23, and executes the charge of the battery 128 and the power supply to the thermistor 133.

The foregoing "a certain time" refers to a sufficient time necessary for the thermistor 133 to transmit the proper output to the CPU 111. The control section 110 calculates the temperature measuring value from the output of the thermistor 133 after a certain time elapses from the start of the charge and enables the initial value α to store the temperature measuring value (ACT S2). As the value supposed to be the latest value β at this time point is the value of the initial value α, the control section 110 continues the processing in ACT S2 to update (overwrite) the latest value β with the initial value α.

Next, the control section 110 determines whether or not the initial value α is equal to or lower than the temperature (a first threshold value: e.g., 60 degrees centigrade) set as a reference (ACT S3). If it is determined that the initial value α is equal to or lower than the first threshold value, the control section 110 continues the processing. Herein, the first threshold value is a temperature appropriate to forgo the charge continuation due to too high temperature for the execution of the charge.

The control section 110 saves the previous measured value (ACT S4) prior to the measurement of the latest temperature (ACT S5). In other words, the previous value γ is updated with the value stored in the latest value β.

The control section 110 calculates the temperature measuring value from the output of the thermistor 133 to update the latest value β (ACT S5).

Then, the control section 110 monitors whether or not the charge is completed (ACT S6), and if the charge is completed (Yes in ACT S6), terminates the charge.

In ACT S6, the control section 110 repeats the monitoring about whether or not the charge is completed at a predetermined timing until the charge is completed (No in ACT S6). At the time of monitoring, if the charge is not completed (No in ACT S6), the control section 110 proceeds to the processing in ACT S11.

In ACT S11, the control section 110 determines whether or not the latest value β (degrees centigrade) is equal to or lower than, for example, 60 degrees centigrade (the first threshold value). If it is determined that the latest value β is equal to or lower than 60 degrees centigrade (Yes in ACT S11), the control section 110 further determines whether or not a range of the rising (rising range) of the temperature from the initial value α at a temperature measuring time point of the latest value β is within 30 degrees centigrade (ACT S12). Herein, the foregoing 30 degrees centigrade is an example of a threshold value (a second threshold value) within a range available to the temperature rinsing from the initial value α.

In ACT S12, if it is determined that the difference between β and α is equal to or lower than 30 degrees centigrade (Yes in ACT S12), the control section 110 further determines whether or not the range of the temperature rising from the previous value γ at the measuring time point of the latest value β is equal to or lower than 2 degrees centigrade (ACT S13). Herein, the foregoing 2 degrees centigrade is an example of a threshold value (a third threshold value) within a range available to the temperature rising from the previous value γ.

In ACT S13, if it is determined that the difference between β and γ is equal to or lower than 2 degrees centigrade (Yes in ACT S13), the control section 110 returns to the processing in ACT S4.

In ACT S13, the range of the temperature rising from the previous value γ at the measuring time point of the latest value β is higher than 2 degrees centigrade (third threshold value) (No in ACT S13), for example, as there is a concern about a sudden temperature rising, the control section 110 carries out notification for calling attention of a user (ACT S14). In ACT S14, the control section 110, specifically, enables the LCD 141 to display that it is in a state where there is a concern about the sudden temperature rising and communicates that state to the predetermined external device via the communication I/F 125. Further, the display message, for example, may contain contents for notifying that charge efficiency is not good, or contain contents for promoting the change of positions to the charge stand 2 of the printer 1 serving as the power receiving apparatus.

In ACT S11, if the latest value β is higher than 60 degrees centigrade (No in ACT S11), or in ACT S12, the range of the temperature rising from the initial value α at the temperature measuring time point of the latest value β exceeds 30 degrees centigrade (No in ACT S12), the control section 110 proceeds to the processing in ACT S21. In ACT S21, the control section 110 temporarily stops the charge. In particular, the control section 110 instructs the power receiving device 131 to stop the operation. As the generation of the heat is stopped along with the stop of the power receiving device 131, the temperature is gradually decreased.

Next, the control section 110 displays a message indicating that the charge is stopped (ACT S22). The message display is carried out by either or both of the LCD 141 and the external device communicable through the communication I/F. Furthermore, the status of stopping the charge may be displayed by the LED 152.

The control section 110 carries out the charge for a certain time (ACT S24) and acquires the output of the thermistor 133 to calculate the latest value β (ACT S25) every time the control section 110 waits for a predetermined time from the stop of the charge (ACT S23).

In ACT S26, the control section 110 determines whether or not the temperature is sufficiently low (ACT S26). The determination is carried out according to whether or not the latest value β meets two conditions. The first condition is whether or not the latest value β is equal to or lower than the first threshold value. The second condition is whether or not the difference between the latest value β and the initial value α is equal to or lower than a fourth threshold value. Herein, the foregoing fourth threshold value is, for example, 25 degrees centigrade lower than the second threshold value (30 degrees centigrade). If the two conditions are met (Yes in ACT S26), the control section 110 regards that the temperature is sufficiently reduced, and restarts the charge (ACT S27).

If the charge is restarted, the control section 110 switches the message display indicating the stop of the charge executed in the processing in ACT S22 to the message display indicating that the charge is executed (ACT S28), and then returns to the processing in ACT S4.

At the time of determination in ACT S26, in a case in which the temperature is not sufficiently low (No in ACT S26), the control section 110 returns to the processing in ACT S23 and further stands by.

In ACT S3, if the initial value α is higher than the first threshold value (60 degrees centigrade) (No in ACT S3), the control section 110 stops the charge (ACT S31). Continuously, the control section 110 displays a message indicating the charge is stopped (ACT S32) similar to the processing in ACT S22. Then, the control section 110 returns to the processing in ACT S1 after waiting for a certain time (ACT S33).

In this way, according to the present embodiment, the temperature at the initial time and the temperature in the charge, further the temperature rising situation are monitored, and if there is abnormality, the charge is temporarily stopped. Further, according to the present embodiment, the decrease of the temperature during the stop of the charge is also monitored, and if the status becomes good, the charge is automatically restarted. In this way, the charge can be properly completed without abnormally terminating the charge due to the generation of the heat.

Further, as the portable printer 1 operates through the battery 128, it is unfavorable to consume the electric power of the battery 128 other than the main operation as the printer such as printing. According to the present embodiment, as a route for supplying power from the battery 128 to the power receiving device 131 is not arranged, the electric power held by the battery 128 is not consumed in the operation of the thermistor 133. Thus, there is no inconvenience that the durability of the battery 128 is damaged by the thermistor 133.

Further, in the present embodiment, focusing on that the temperature measurement by the thermistor 133 is limited to the charge process, the thermistor 133 is operated through the power supply from the power receiving device 131. In this way, even if the power is not supplied from the battery 128 to the power receiving device 131, the failure does not occur, and the thermistor 133 can operate.

Further, in the present embodiment, the first threshold value is set to, for example, 60 degrees centigrade, the second threshold value is set to, for example, 30 degrees centigrade, the third threshold value is set to, for example, 2 degrees centigrade, and the fourth threshold value is set to, for example, 25 degrees centigrade; however, it is needless to say that theses temperatures in the embodiment may be changed to suitable values.

Further, in the present embodiment, as the processing along with the determination of the temperature, the stop of the charge and the notification for calling attention of the user are exemplified. Then, as temperature determination, the initial temperature α, the latest temperature β, the situation of the rising of β from α, and the situation of the rising of β from the previous temperature γ are monitored. In the embodiment, the combination of the determination of the temperature and the processing along with the determination of the temperature may not be same as that in the present embodiment, or may be any combination. In other words, for example, that the latest temperature β exceeds the first threshold value may be set as a condition to carry out notification for calling the attention of the user.

The programs executed by the printer 1 of the present embodiment may be incorporated into the FROM 112 to be supplied.

The programs executed by the printer 1 of the present embodiment may be recorded in a computer-readable recording medium such as a CD-ROM, a FD (flexible disk), a CD-R, a DVD (Digital Versatile Disk) as a file of an installable form or an executable form to be supplied.

The programs executed by the printer 1 of the present embodiment may be stored in a computer connected to a network such as an internet or be provided by being downloaded via the network. The program executed by the printer 1 of the present embodiment may be provided or distributed via the network such as the internet.

The programs executed by the printer 1 of the present embodiment has module configuration including the above-described each section (for example, the charge control section 1101). The CPU 111 (processor) reads the programs from the storage medium to execute them to load the foregoing each section on the main storage device. In this way, various modules (for example, the charge control section 1101) are generated on the main storage device.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities, temperatures, etc., used in the specification and claims are to be understood as modified in all instances by the term "about."

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An electronic apparatus, comprising:
   a power receiving device configured to receive electric power transmitted from a power transmitting apparatus in a non-contact manner, and
   charge a battery that powers the electronic apparatus with the electric power;
   a temperature monitor configured to change an output according to temperature; and
   a charge controller configured to instruct the power receiving device to execute charge control of the battery based on the output of the temperature monitor, wherein
   the charge controller is configured to:
   stop the charging when a difference between a latest value corresponding to a temperature measuring value during charging and an initial value corresponding to an original temperature measuring value at the time of starting charging is higher than a second threshold value, and
   restart the charging when the difference between the latest value and the initial value is equal to or lower than a fourth threshold value.

2. The electronic apparatus according to claim 1, wherein the temperature monitor operates by using the electric power received by the power receiving device.

3. The electronic apparatus according to claim 1, further comprising
   a communication section configured to communicate with an external device, wherein
   the charge controller carries out notification to the external device.

4. A method of charging an electronic apparatus, comprising:
   receiving, by the electronic apparatus, electric power transmitted from a power transmitting apparatus in a non-contact manner to charge a battery that powers the electronic apparatus with the electric power;

changing an output according to temperature; and executing charge control of the battery based on the output, wherein in the executing of the charge control, the charging is stopped when a difference between a latest value corresponding to a temperature measuring value during charging and an initial value corresponding to an original temperature measuring value at the time of starting charging is higher than a second threshold value, and the charging is restarted when the difference between the latest value and the initial value is equal to or lower than a fourth threshold value.

5. The method according to claim 4, further comprising communicating with an external device.

6. The method according to claim 4, wherein the output comprises three variables including an initial value $\alpha$ corresponding to an original temperature measuring value at the time of starting charging, a latest value $\beta$ corresponding to a temperature measuring value during charging, and a previous value $\gamma$ corresponding to a value immediately before the latest value $\beta$ is updated.

7. The method according to claim 6, further comprising determining whether the latest value $\beta$ is equal to or lower than a first threshold value.

8. The method according to claim 6, further comprising determining whether the latest value $\beta$ is equal to or lower than a first threshold value and further determining whether the difference between the latest value $\beta$ and the initial value $\alpha$ is less than or equal to the second threshold value.

9. The method according to claim 6, further comprising determining whether the difference between the latest value $\beta$ and the initial value $\alpha$ is equal to or lower than the second threshold value, and further determining whether a difference between the latest value $\beta$ and the previous value $\gamma$ is less than or equal to a third threshold value.

10. The method according to claim 6, further comprising determining whether a difference between the latest value $\beta$ and the previous value $\gamma$ is higher than a third threshold value.

11. The method according to claim 4, wherein the executing of the charge control comprises monitoring whether charging is completed, and if the charging is completed, terminating the charging.

12. The method according to claim 4, wherein the executing of the charge control comprises determining if charging is not completed, and if the charging is not completed, continuing the charging.

* * * * *